(12) United States Patent
Yoshida

(10) Patent No.: US 11,297,305 B2
(45) Date of Patent: Apr. 5, 2022

(54) THREE-DIMENSIONAL IMAGE PRODUCTION SUPPORT APPARATUS

(71) Applicant: NATIONAL INSTITUTE OF INFORMATION AND COMMUNICATIONS TECHNOLOGY, Koganei (JP)

(72) Inventor: Shunsuke Yoshida, Koganei (JP)

(73) Assignee: NATIONAL INSTITUTE OF INFORMATION AND COMMUNICATIONS TECHNOLOGY, Koganei (JP)

( * ) Notice: Subject to any disclaimer, the term of this patent is extended or adjusted under 35 U.S.C. 154(b) by 811 days.

(21) Appl. No.: 16/302,162

(22) PCT Filed: May 11, 2017

(86) PCT No.: PCT/JP2017/017907
§ 371 (c)(1),
(2) Date: Nov. 16, 2018

(87) PCT Pub. No.: WO2017/199855
PCT Pub. Date: Nov. 23, 2017

(65) Prior Publication Data
US 2020/0150452 A1 May 14, 2020

(30) Foreign Application Priority Data
May 17, 2016 (JP) .............................. JP2016-098465

(51) Int. Cl.
*G02B 30/00* (2020.01)
*G03B 35/18* (2021.01)
(Continued)

(52) U.S. Cl.
CPC ........... *H04N 13/388* (2018.05); *G03B 35/18* (2013.01); *H04N 13/30* (2018.05)

(58) Field of Classification Search
CPC ...... G02B 30/40; G02B 30/56; G03B 21/606; G03B 35/18; H04N 13/30; H04N 13/368; H04N 13/388
See application file for complete search history.

(56) References Cited

U.S. PATENT DOCUMENTS 7,324,085 B2 * 1/2008 Balakrishnan ...... G06F 3/04812
345/157
8,723,929 B2 * 5/2014 Chen .................... H04N 13/324
348/51
(Continued)

FOREIGN PATENT DOCUMENTS

JP 2010-32952 A 2/2010
JP 2011-48273 A 3/2011
(Continued)

OTHER PUBLICATIONS

International Search Report dated Aug. 1, 2017, issued in counterpart application No. PCT/JP2017/017907 (2 pages).

*Primary Examiner* — Joon Kwon
(74) *Attorney, Agent, or Firm* — WHDA, LLP

(57) ABSTRACT

Information indicating a shape of a screen, a shape of a viewing area and a relative positional relationship between the viewing area and the screen is acquired. A shared area in which a three-dimensional image presented by a three-dimensional display is to be arranged in order to be observed from any position in the viewing area is created based on the acquired information. Based on the acquired information, a specific area in which a three-dimensional image presented by the three-dimensional display is to be arranged in order to be observed from a specific position in the viewing area is created. The data indicating the created shared area and the data indicating the specific area are generated.

6 Claims, 16 Drawing Sheets

(51) Int. Cl.
*H04N 13/30* (2018.01)
*H04N 13/388* (2018.01)

(56) References Cited

U.S. PATENT DOCUMENTS

| | | | | |
|---|---|---|---|---|
| 8,890,941 | B2 * | 11/2014 | Abeloe | H04N 13/363 |
| | | | | 348/51 |
| 9,674,510 | B2 * | 6/2017 | Aiden | H04N 13/366 |
| 11,073,703 | B2 * | 7/2021 | Joseph | G02B 30/26 |
| 2008/0036969 | A1 | 2/2008 | Otsuka et al. | |
| 2010/0259599 | A1 | 10/2010 | Otsuka et al. | |
| 2012/0146897 | A1 | 6/2012 | Yoshida et al. | |

FOREIGN PATENT DOCUMENTS

| | | |
|---|---|---|
| JP | 2011-153497 A | 8/2011 |
| JP | 2012-13788 A | 1/2012 |
| JP | 2013-21522 A | 1/2013 |
| JP | 5187639 B2 | 4/2013 |
| JP | 2016-18119 A | 2/2016 |
| WO | 2006/027855 A1 | 3/2006 |

\* cited by examiner

THREE-DIMENSIONAL IMAGE PRODUCTION SUPPORT APPARATUS

TECHNICAL FIELD

The present invention relates to a three-dimensional image production support apparatus that assists production of a three-dimensional image.

BACKGROUND ART

Various three-dimensional displays that present three-dimensional images have been developed. In the three-dimensional display described in Patent Documents 1 and 2, a conic light ray controller is arranged. A plurality of scanning projectors arranged around the light ray controller respectively emit a light ray group including a plurality of light rays to an outer peripheral surface of the light ray controller. The light ray controller transmits each light ray emitted from each scanning projector while not diffusing the light ray in a circumferential direction, whereby a three-dimensional image is displayed above and inside of the light ray controller.

A three-dimensional image production support apparatus for producing a three-dimensional image presented in a three-dimensional display is described in Patent Document 3. The three-dimensional image production support apparatus presents a specific area defined by a predefined viewing area, a shape of a screen, dimensions of the screen and the like. A producer of a three-dimensional display arranges a three-dimensional image in the presented area. Thus, an observer can view the three-dimensional image presented by the three-dimensional display from every position in the viewing area.

[Patent Document 1] JP 2010-32952 A
[Patent Document 2] JP 2011-48273 A
[Patent Document 3] JP 2013-21522 A

SUMMARY OF INVENTION

Technical Problem

It may be desirable that the three-dimensional image viewable by an observer who is present at a specific position in the viewing area but not viewable by an observer who is present at another position in the viewing area is presented by the three-dimensional display. When such a three-dimensional image is created using the three-dimensional image production support apparatus of Patent Document 3, it is necessary to determine the condition corresponding to the position in the viewing area at the time of calculation in the process of creating the three-dimensional image. Therefore, the process of creating the three-dimensional image becomes complicated.

An object of the present invention is to provide a three-dimensional image production support apparatus that enables creation of a three-dimensional image that is viewable by an observer who is present at a specific position in a viewing area and not viewable by an observer who is present at another position in the viewing area with a simple process.

Solution to Problem (1) A three-dimensional image production support apparatus according to one aspect of the present invention that assists production of a three-dimensional image that is presented by a three-dimensional display including a screen having a shape surrounding a center axis extending in an up-and-down direction and is observable from a viewing area defined to be annular and surround the center axis includes an acquirer that acquires information indicating a shape of the screen, a shape of the viewing area and a relative positional relationship between the viewing area and the screen, a shared area creator that creates an area, in which a three-dimensional image presented by the three-dimensional display is to be arranged in order to be observed from any position in the viewing area, as a shared area based on the information acquired by the acquirer, a specific area creator that creates an area, in which a three-dimensional image presented by the three-dimensional display is to be arranged in order to be observed from a predetermined first specific position in the viewing area, as a first specific area based on the information acquired by the acquirer, and a generator that generates data indicating the shared area created by the shared area creator and data indicating the first specific area created by the specific area creator, wherein the specific area creator specifies a range that is viewable from the first specific position in an inner surface of the screen as a viewable range, specifies an area in which a three-dimensional image that is observable from the first specific position is to be arranged as a first arrangement area based on the viewable range, and creates a portion excluding the shared area created by the shared area creator of the first arrangement area as the first specific area.

In this three-dimensional image production support apparatus, the information indicating the shape of the screen, the shape of the viewing area and the relative positional relationship between the viewing area and the screen is acquired. Based on the acquired information, the shared area in which the three-dimensional image presented by the three-dimensional display is to be arranged in order to be observed from any position in the viewing area is created. Further, based on the acquired information, the first specific area in which the three-dimensional image presented by the three-dimensional display is to be arranged in order to be observed from the first specific position in the viewing area is created. The data indicating the created shared area and the data indicating the first specific area are generated.

In the creation of the first specific area, the viewable range that is viewable from the first specific position in the inner surface of the screen is specified. The first arrangement area of the three-dimensional image that is observable from the first specific position is specified based on the viewable range. The portion excluding the shared area of the first arrangement area is created as the first specific area.

In this case, the producer of the three-dimensional image can identify the shared area and the first specific area based on the data generated by the generator. Thus, the producer of the three-dimensional image can easily arrange the three-dimensional image to be observed from any position in the viewing area in the shared area when producing the three-dimensional image. Further, the producer of the three-dimensional image can easily arrange the three-dimensional image to be observed from the first specific position in the viewing area in the first specific area when producing the three-dimensional image.

The three-dimensional image arranged in the shared area is observable by the observer who is present at any position in the viewing area. On the other hand, the three-dimensional image arranged in the first specific area is viewable by the observer who is present at the specific position in the viewing area. However, it does not necessary mean that the observer who is present at another position in the viewing area can view the three-dimensional image arranged in the first specific area. With this configuration, it is not necessary to perform a complicated process during the production of the three-dimensional image. Thus, the three-dimensional image, which the observer who is present at the specific position in the viewing area can view and the observer who is present at another position in the viewing area is restricted to view, can be created with a simple process.

(2) The specific area creator may specify a range that is viewable from a predetermined second specific position in the inner surface of the screen as a viewable range, may specify an area in which a three-dimensional image that is observable from the second specific position is to be arranged as a second arrangement area based on the viewable range and may create a portion excluding the shared area and the second arrangement area of the first arrangement area as the first specific area. In this case, the three-dimensional image, which the observer who is present at the first specific position can view and the observer who is present at the second specific position cannot view, can be created with a simple process.

(3) The specific area creator may create a portion excluding the shared area and the first arrangement area of the second arrangement area as the second specific area, and the generator may further generate data indicating the second specific area created by the specific area creator. In this case, the three-dimensional image, which the observer who is present at the second specific position can view and the observer who is present at the first specific position cannot view, can be further created with a simple process.

(4) The shared area creator may section the screen and the viewing area with a virtual plane including the center axis, may specify first and second intersection points that are positioned opposite to each other with the center axis interposed therebetween as intersection points of the virtual plane and the viewing area, may specify one or a plurality of intersection lines as an intersection line of the virtual plane and the screen, may specify a line that indicates a range viewable from the first intersection point out of the one or plurality of intersection lines as a first viewable line, may specify a line that indicates a range viewable from the second intersection point out of the one or plurality of intersection lines as a second viewable line, may create a planar area that is surrounded by a first line extending in a straight line from the first intersection point through one end of the first viewable line, a second line extending in a straight line through the first intersection point and another end of the first viewable line, a third line extending in a straight line from the second intersection point through one end of the second viewable line and a fourth line extending in a straight line from the second intersection point through another end of the second viewable line, and may create an area through which the planar area has passed by rotating the planar area about the center axis as the shared area. In this case, the shared area can be created easily.

(5) The specific area creator may specify a fifth line extending in a straight line from the first specific position through any portion at one end of the screen, and may specify an area surrounded by the fifth line by sweeping the fifth line on one end of the screen with the first specific position as a supporting point as the first arrangement area. In this case, the first arrangement area can be specified easily.

(6) The first specific area may include a first partial area that is arranged closer to the first specific position than the screen and a second partial area that is arranged farther from the specific position than the screen. In this case, the size of the first specific area can be increased easily. Further, the three-dimensional image that is to be arranged closer to the first specific position than the screen can be arranged closer to the first specific position than the screen, and the three-dimensional image to be arranged farther from the specific position than the screen can be arranged farther from the specific position than the screen.

Advantageous Effects of Invention

The present invention enables creation of the three-dimensional image that is viewable only by the observer who is present at the specific position in the viewing area with a simple process.

BRIEF DESCRIPTION OF THE DRAWINGS

DESCRIPTION OF EMBODIMENTS (1) Overall Configuration of Three-Dimensional Image Production Support Apparatus A three-dimensional image production support apparatus according to one embodiment of the present invention will be described below with reference to drawings. The three-dimensional image production support apparatus according to the present embodiment assists the production of three-dimensional images to be presented by a three-dimensional display. FIG. 1 is a block diagram showing a configuration of the three-dimensional image production support apparatus according to the present embodiment. As shown in FIG. 1, the three-dimensional image production support apparatus 100 includes a storage 110, a calculation processor 120, an inputter 130 and an outputter 140.

Figure 1:
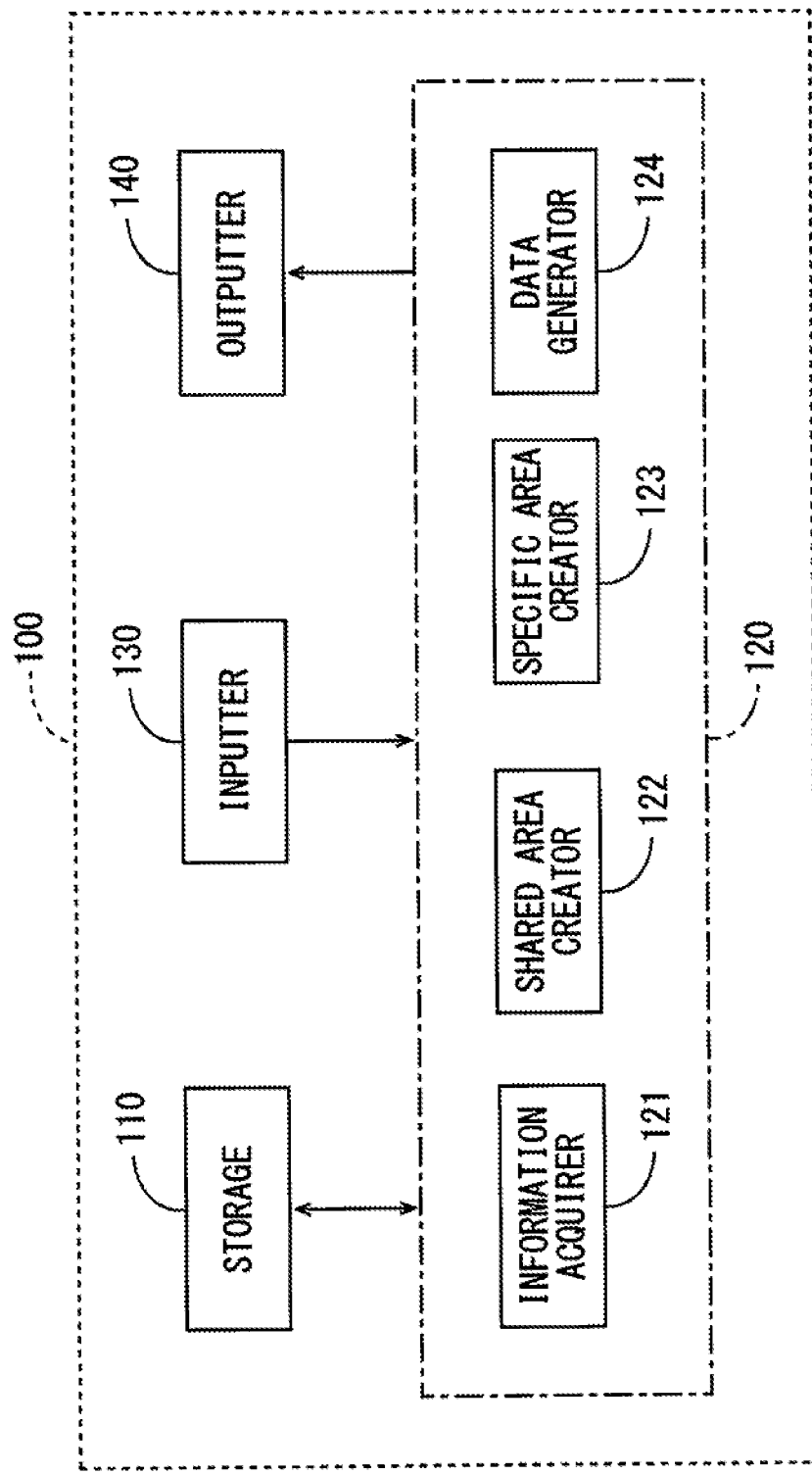
FIG. 1 is a block diagram showing a configuration of a three-dimensional image production support apparatus according to a present embodiment.

The storage 110 includes a storage device such as a hard disk drive or a memory card, for example. In the storage 110, a three-dimensional image production assistance program for executing a three-dimensional image production assistance process and various information, described below, are stored. Details of the three-dimensional image production assistance program will be described below. External three-dimensional image production software such as a three-dimensional modeler may be stored in the storage 110. In this case, the three-dimensional image production assistance program may be incorporated in the three-dimensional image production software.

The calculation processor 120 includes an information acquirer 121, a shared area creator 122, a specific area creator 123 and a data generator 124. The calculation processor 120 is constituted by a CPU (Central Processing Unit), a ROM (Read Only Memory) and a RAM (Random Access Memory), for example. A system program is stored in the ROM. The CPU executes the three-dimensional image production assistance program stored in the storage 110 on the RAM, whereby the functions of the information acquirer 121, the shared area creator 122, the specific area creator 123 and the data generator 124 are implemented.

The information acquirer 121 acquires screen information and viewing area information, described below. The shared area creator 122 creates a shared area, described below. The specific area creator 123 creates a specific area, described below. The data generator 124 generates shared area data and specific area data and supplies the shared area data and the specific area data to the outputter 140.

The inputter 130 includes a pointing device such as a mouse, and a keyboard, for example. A manufacturer of a three-dimensional display inputs the below-mentioned information in the calculation processor 120 in advance using the inputter 130. The inputter 130 may include a reading device that can read data from an external storage medium such as a CD (Compact Disc) or a RAM, or may include an interface that is connectable to the Internet. In this case, the inputter 130 can acquire the information stored in the external storage medium in advance or the information transmitted from the Internet and can input the information in the calculation processor 120.

The outputter 140 includes a data output circuit and an image display device. This outputter 140 outputs the below-mentioned various data from the data output circuit, and displays the image based on the various data in the image display device. As the image display device, a liquid crystal display panel, a plasma display panel or an organic EL (Electroluminescence) panel is used, for example.

The outputter 140 may output various data to an external three-dimensional image production apparatus, for example, and may output various data to a storage medium such as a CD (Compact Disc) or a DVD (Digital Versatile Disc). Alternatively, the outputter 140 may transmit various data to the external three-dimensional image production apparatus by wired communication or wireless communication.

Figure 2:
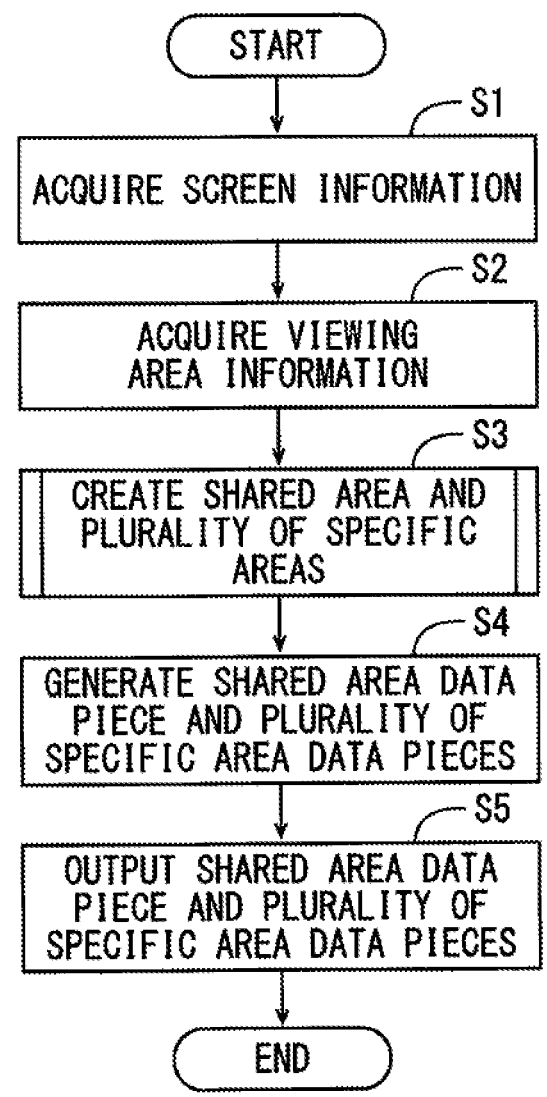
FIG. 2 is a flow chart showing overall schematic operations of the three-dimensional image production support apparatus of FIG. 1.

(2) Overall Schematic Operations of Three-Dimensional Image Production Support Apparatus FIG. 2 is a flow chart showing the overall schematic operations of the three-dimensional image production support apparatus 100 of FIG. 1. In the present embodiment, a three-dimensional display having only horizontal parallax is used. Further, the three-dimensional image produced by the three-dimensional image production support apparatus 100 includes a shared three-dimensional image that is viewable by the observer who is present at any position in the viewing area and a specific three-dimensional image that is viewable only by the observer who is present at a specific position in the viewing area. Here, presence of an observer at a certain position in the viewing area means presence of the eyes of the observer at the certain position in the viewing area.

The manufacturer of the three-dimensional display inputs screen information in advance using the inputter 130. The screen information is the information relating to the shape and dimensions of the screen of the three-dimensional display. The screen information is indicated by various parameters such as positions of a plurality of portions in the screen, the shape and dimensions of a specific portion in the screen and the like. Here, the screen is the plane that generates a plurality of light rays for presenting a three-dimensional image in a space. For example, the positions of the plurality of portions in the screen may be indicated by the actual world coordinate system. The calculation processor 120 acquires the input screen information (step S1).

Further, the manufacturer of the three-dimensional display inputs the viewing area information in advance using the inputter 130. The viewing area information is the information indicating the viewing area in which an observer is assumed to be present and a relative positional relationship between the viewing area and the screen of the three-dimensional display. Here, the viewing area is the collection of viewpoints of the observers, and includes a plurality of occupied areas allocated to a plurality of observers. For example, the viewing area may be indicated by the actual world coordinate system. Alternatively, the viewing area may be indicated by the coordinates relative to the screen of the three-dimensional display. The calculation processor 120 acquires the input viewing area information (step S2).

Next, the calculation processor 120 creates a shared area and a plurality of specific areas based on the acquired screen information and the acquired viewing area information (step S3). Here, the shared area is the area in which a shared three-dimensional image is to be arranged when a producer of the three-dimensional image produces the three-dimensional image by three-dimensional image production software or a three-dimensional image production device. Each specific area is the area in which any one specific three-dimensional image is to be arranged when the producer of the three-dimensional image produces the three-dimensional image by the three-dimensional image production software or the three-dimensional image production device. A plurality of specific areas are provided to respectively correspond to a plurality of occupied areas in the viewing area and not to overlap with the shared area. While the plurality of specific areas are created in the present embodiment, one specific area may be created.

A shared three-dimensional image is arranged in the shared area, so that the shared three-dimensional image is presented by the three-dimensional display. The observer can view the shared three-dimensional image three-dimensionally without any uncomfortable feeling from any position in the viewing area. On the other hand, a specific three-dimensional image is arranged in any one specific area, so that the specific three-dimensional image is presented by the three-dimensional display. The observer who is present in the occupied area corresponding to the specific area can view the specific three-dimensional image three-dimensionally without any uncomfortable feeling from any position in the occupied area. The observer who is present in another occupied area cannot view the specific three-dimensional image. Details of the method of creating a shared area and a specific area will be described below.

Thereafter, the calculation processor 120 generates a shared area data piece indicating the shape and size of the created shared area, and generates a plurality of specific area data pieces respectively indicating the shapes and sizes of the plurality of generated specific areas (step S4). Further, the calculation processor 120 outputs the shared area data piece and the plurality of specific area data pieces to the outputter 140 (step S5). Thus, the image indicating the shared area is displayed in the image display device based on the shared area data piece. Further, the image indicating the plurality of specific areas is displayed in the image display device based on the plurality of specific area data pieces.

For example, when the three-dimensional image production software is stored in the storage 110, the producer of the three-dimensional image can easily arrange the shared three-dimensional image produced using the three-dimensional image production software in the image of the shared area displayed in the image display device. Similarly, the producer of the three-dimensional image can easily arrange the specific three-dimensional image produced using the three-dimensional image production software in the image of any one specific area displayed in the image display device.

When the three-dimensional image production assistance program is incorporated in the three-dimensional image production software, the shared area data piece and the plurality of specific area data pieces generated by the calculation processor 120 are supplied to the three-dimensional image production software. Thus, the image of the shared area that is based on the shared area data piece and the images of the specific areas that are respectively based on the plurality of specific area data pieces are displayed in the image display device using a display function of the three-dimensional image production software.

(3) Configuration of Three-dimensional Display

Figure 3:
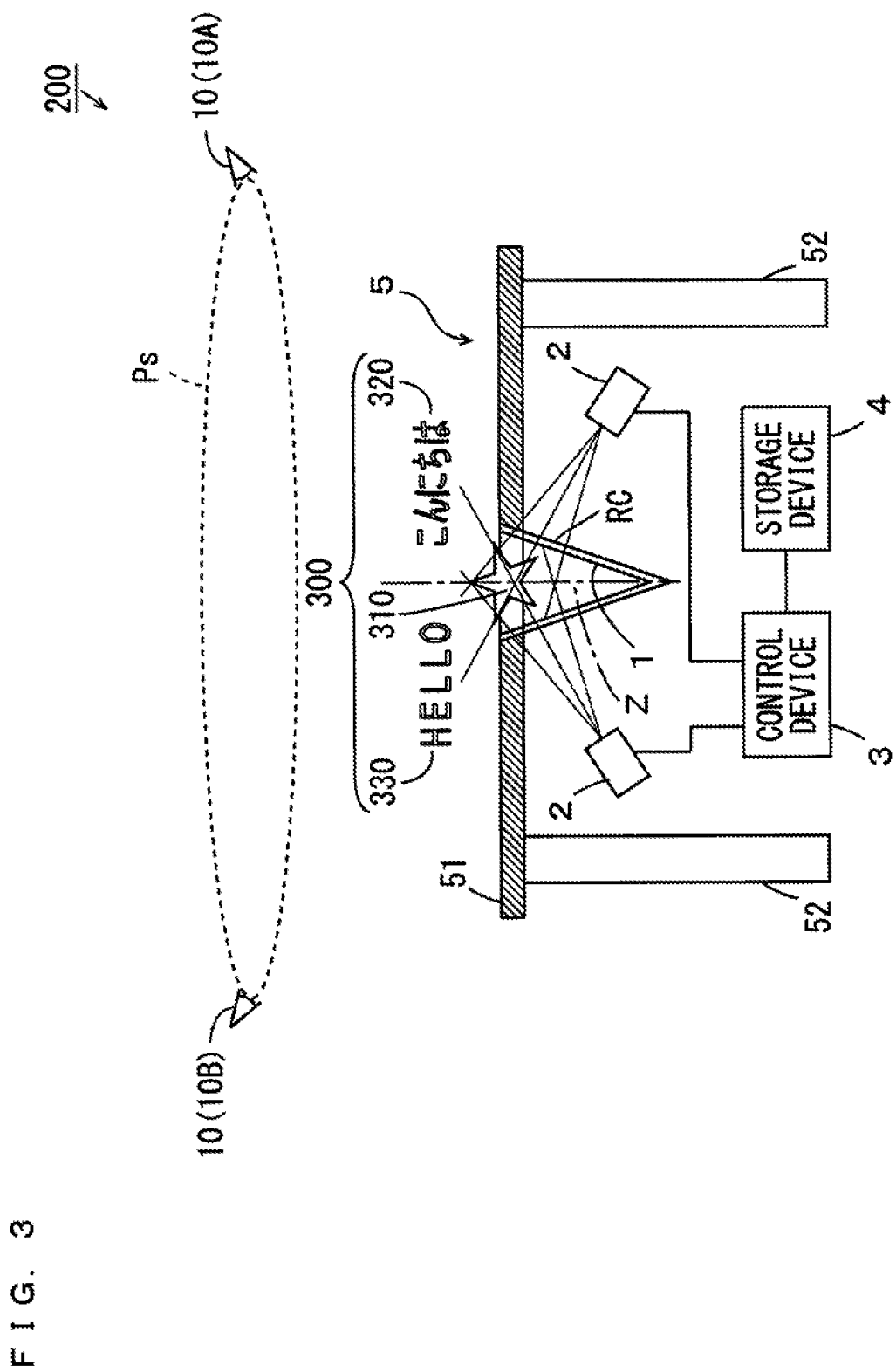
FIG. 3 is a schematic cross sectional view of a three-dimensional display.
Figure 4:
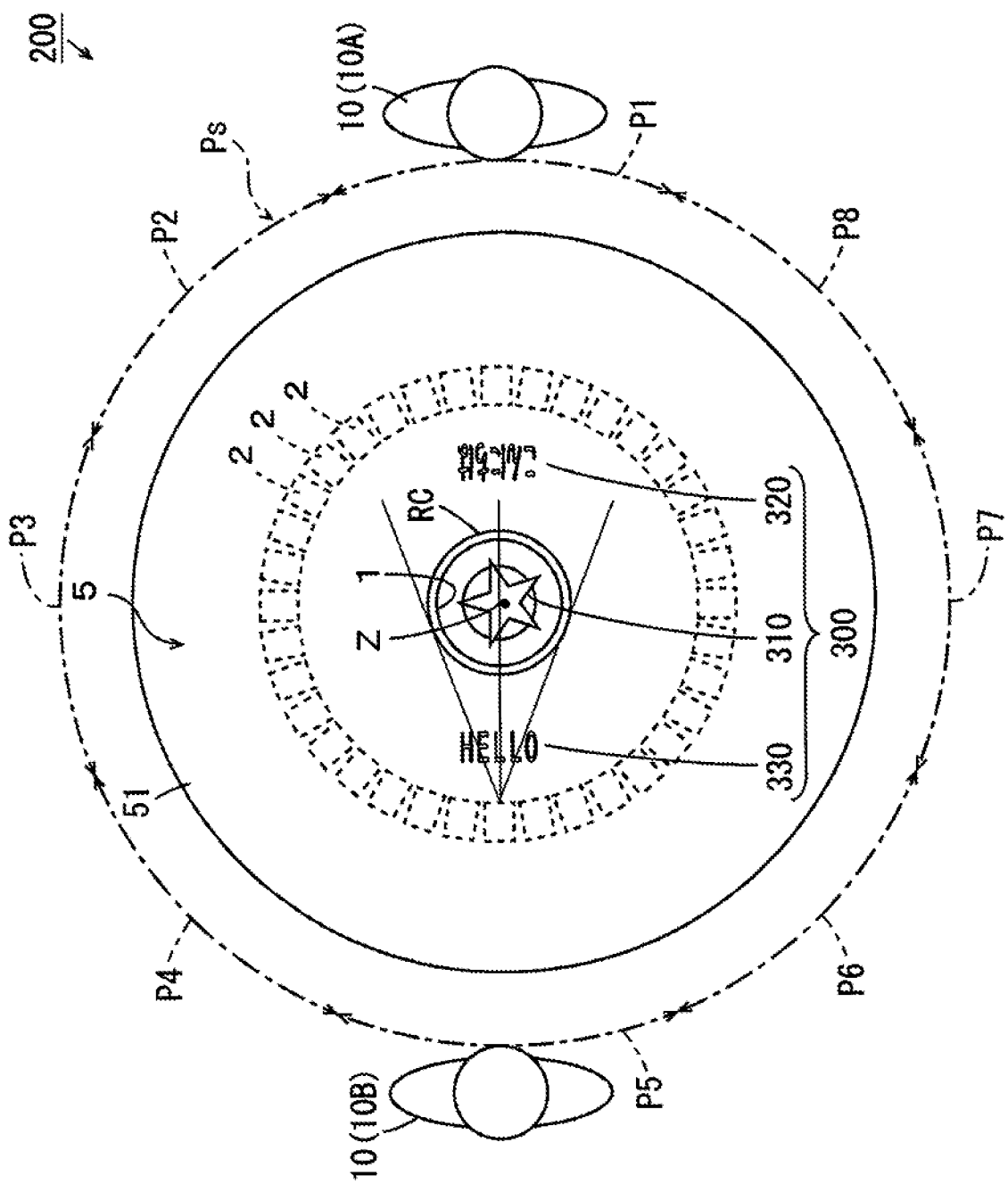
FIG. 4 is a schematic plan view of the three-dimensional display of FIG. 3.
Figure 5:
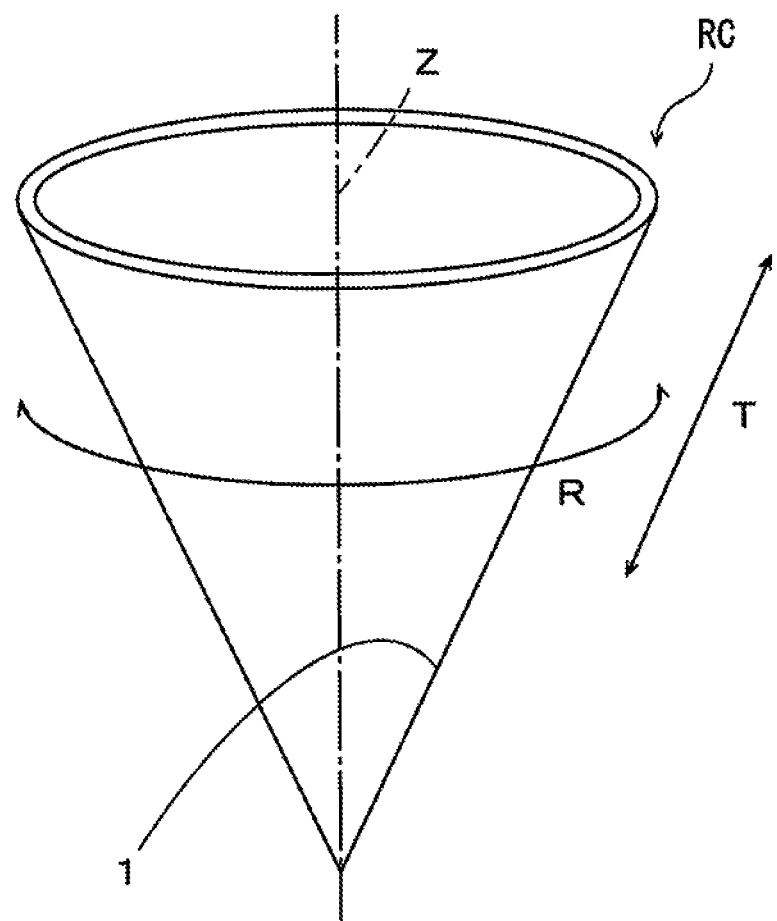
FIG. 5 is a perspective view of a light ray controller used in the three-dimensional display of FIGS. 3 and 4.

FIG. 3 is a schematic cross sectional view of the three-dimensional display. FIG. 4 is a schematic plan view of the three-dimensional display 200 of FIG. 3. FIG. 5 is a perspective view of a light ray controller RC used in the three-dimensional display 200 of FIGS. 3 and 4.

As shown in FIG. 3, the three-dimensional display 200 is constituted by a screen 1, a plurality of light ray generators 2, a control device 3 and a storage device 4. The screen 1 is formed at an inner peripheral surface of the conic light ray controller RC. Each light ray generator 2 is a scanning projector, for example. The three-dimensional display 200 of FIGS. 3 and 4 is provided at the table 5. The table 5 is made of a top board 51 and a plurality of legs 52. The top board 51 has a circular hole.

As shown in FIG. 5, the light ray controller RC has a rotationally-symmetric cone shape with an axis Z extending in an up-and-down direction as the center. The base of the light ray controller RC is open. The light ray controller RC is formed such that the incident light ray is transmitted while being diffused in a ridge line direction T, and is formed such that the incident light ray is transmitted while hardly being diffused in a circumferential direction R with the axis Z as the center and travels in a straight line.

As shown in FIG. 3, the light ray controller RC is fitted into the circular hole in the top board 51 such that the base opening is directed upward. Observers 10 who are around the table 5 can observe the inner peripheral surface of the light ray controller RC obliquely from above the top board 51 of the table 5. In the present example, two observers 10 are present around the table 5. The two observers 10 are respectively referred to as observers 10A, 10B. Suppose that the observer 10A is good at reading in Japanese, and the observer 10B is good at reading in English.

As shown in FIG. 4, a viewing area Ps is indicated by the circumference with the axis Z as the center. The viewing area Ps has a plurality (eight in the example of FIG. 4) of occupied areas P1 to P8 that are formed when the viewing area Ps is equally divided with the axis Z as the center. The occupied areas P1 to P8 are arranged in this order in the counterclockwise direction when seen in plan view. Therefore, the occupied area P1 and the occupied area P5 are opposite to each other with the axis Z interposed therebetween, and the occupied area P2 and the occupied area P6 are opposite to each other with the axis Z interposed therebetween. Further, the occupied area P3 and the occupied area P7 are opposite to each other with the axis Z interposed therebetween, and the occupied area P4 and the occupied area P8 are opposite to each other with the axis Z interposed therebetween. While the occupied areas P1 to P8 do not overlap with one another in the present embodiment, parts of adjacent two occupied areas out of the occupied areas P1 to P8 may overlap with each other. The observers 10A, 10B are present in the occupied areas P1, P5, respectively.

The plurality of light ray generators 2 are arranged below the table 5 on the circumference with the axis Z of the light ray controller RC as the center. The plurality of light ray generators 2 are provided to emit light rays to an outer peripheral surface of the light ray controller RC obliquely from below the light ray controller RC. Each light ray generator 2 can emit light rays and deflect the light rays in a horizontal plane and a vertical plane. Thus, each light ray controller 2 can scan the outer peripheral surface of the light ray controller RC with light rays. Here, a light ray refers to the light that does not diffuse and is indicated by a straight line.

The three-dimensional data for presenting the three-dimensional image 300 is stored in the storage device 4. In the present example, the three-dimensional image 300 includes a shared three-dimensional image 310 showing a picture, a specific three-dimensional image 320 showing a character string in Japanese, and a specific three-dimensional image 330 showing a character string in English. The control device 3 is made of a personal computer, for example. The control device 3 controls the plurality of light ray generators 2 based on the three-dimensional data stored in the storage device 4. Thus, the three-dimensional image 300 is presented above the light ray controller RC.

(4) Steps of Creating Shared Area and Specific Areas

Figure 6:
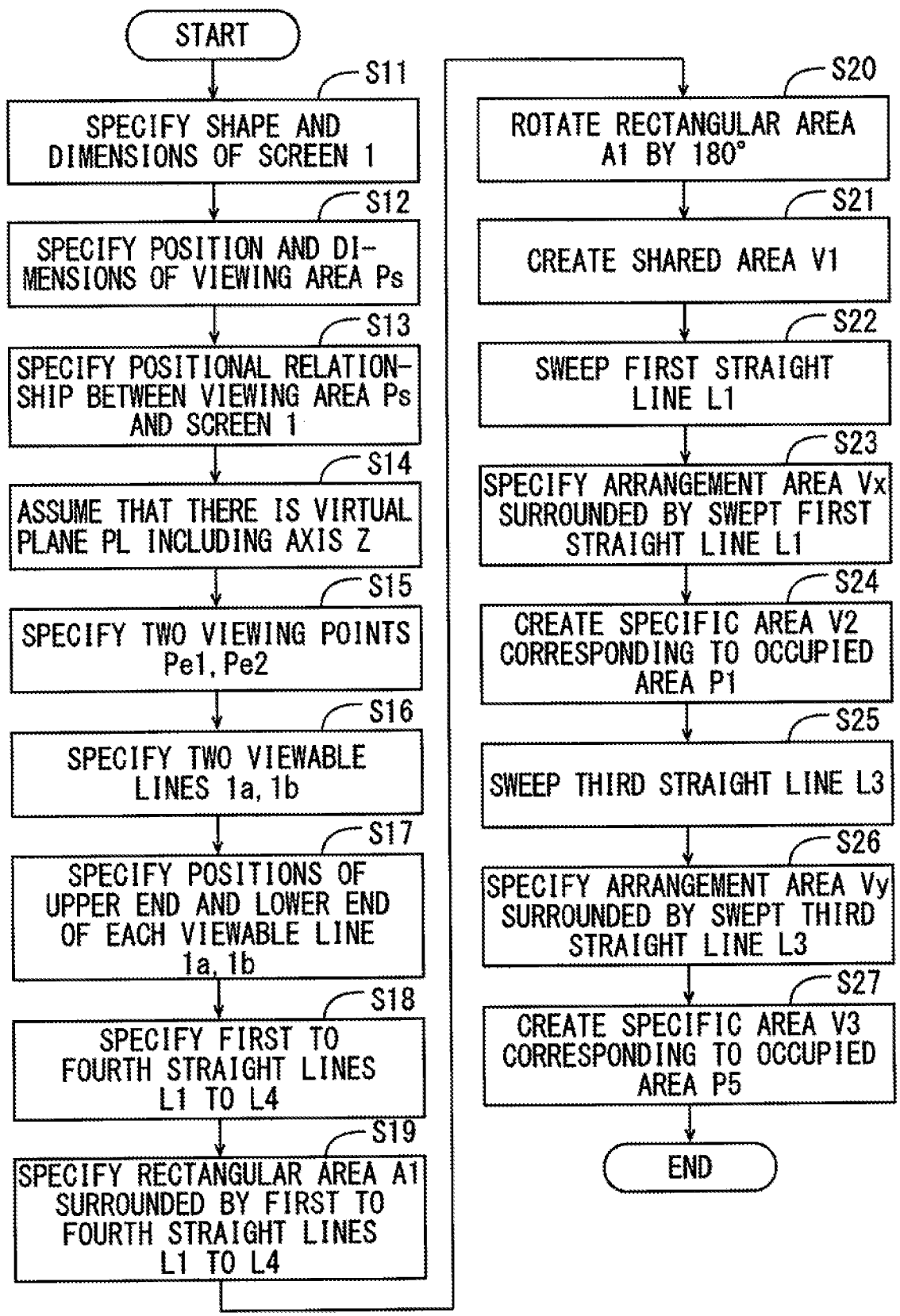
FIG. 6 is a flow chart showing the details of the steps of creating a shared area and a plurality of specific areas in a conic screen of FIG. 5.

FIG. 6 is a flow chart showing the details of the steps of creating a shared area and a plurality of specific areas in the conic screen 1 of FIG. 5. FIGS. 7, 8, 9 and 10 are diagrams for explaining the steps of creating the shared area and the plurality of specific areas. Details of the steps of creating the shared area and the plurality of specific areas in the step S3 of FIG. 2 will be described below with reference to FIGS. 6 to 10.

First, the calculation processor 120 of FIG. 1 specifies the shape and the dimensions of the screen 1 based on the display information (step S11). Further, the calculation processor 120 specifies the position and dimensions of the viewing area Ps based on the viewing area information (step S12). Either the process of the step S11 or the process of the step S12 may be performed first, or both of the process of the step S11 and the process of the step S12 may be performed simultaneously. Next, the calculation processor 120 specifies a relative positional relationship between the viewing area Ps and the screen 1 (step S13). The relative positional relationship between the specified viewing area Ps and the screen 1 is used in the following process.

Figure 7:
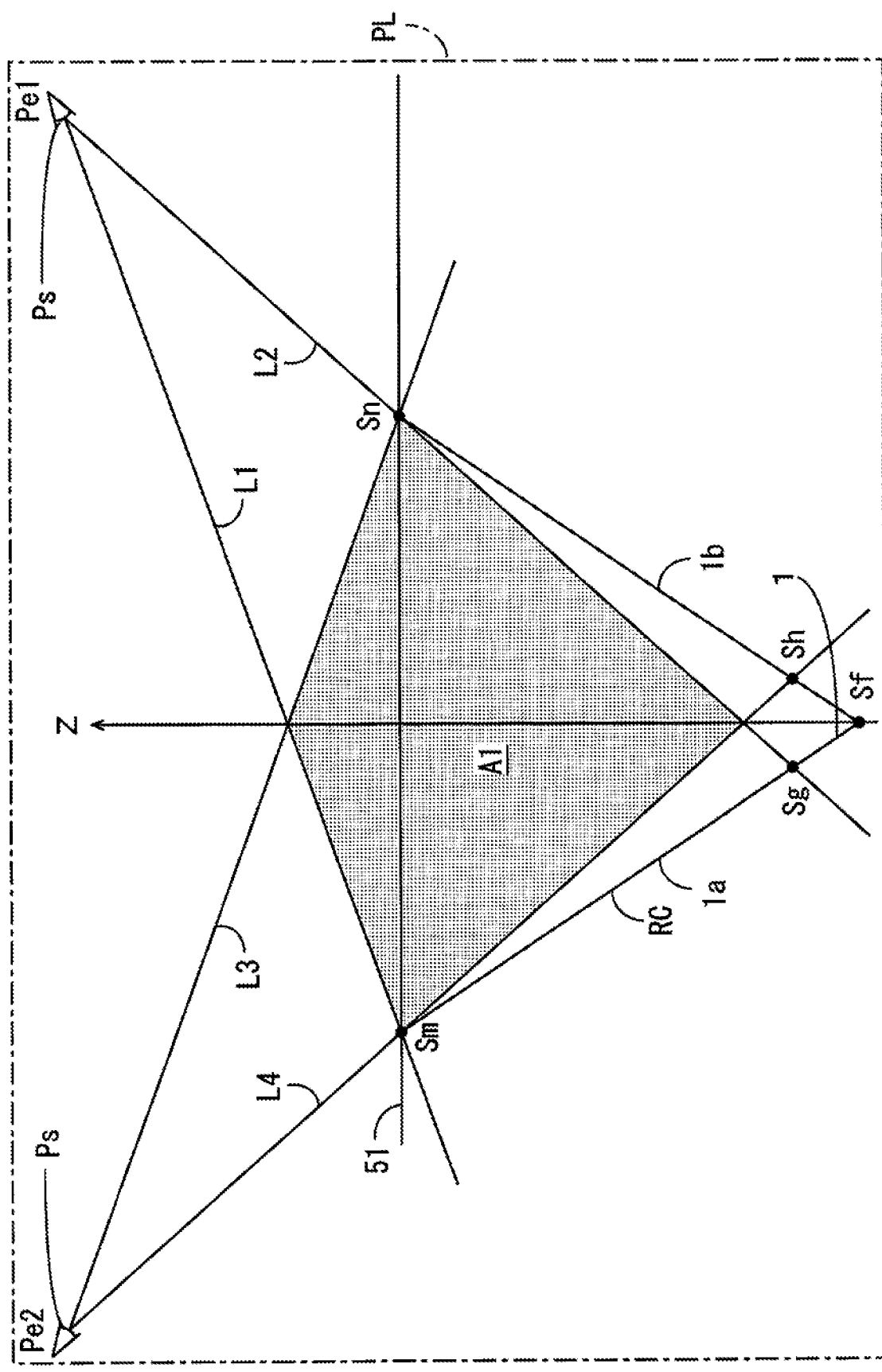
FIG. 7 is a diagram for explaining the steps of creating the shared area and the plurality of specific areas.

As shown in FIG. 7, the calculation processor 120 assumes that there is a virtual plane (hereinafter referred to as a virtual plane) PL including the axis Z (step S14). In the present example, the virtual plane PL passes through the center of the occupied area P1 and the center of the occupied area P5 of FIG. 4 when seen in plan view. Suppose that a viewpoint Pe1 of the observer 10A is positioned at the intersection point of the virtual plane PL and the occupied area P1, and a viewpoint Pe2 of the observer 10B is positioned at the intersection point of the virtual plane PL and the occupied area P5. The calculation processor 120 specifies the two viewpoints Pe1, Pe2 (step S15).

Further, two intersection lines are present between the virtual plane PL and the screen 1. One intersection line that indicates the range viewable from the viewpoint Pe1 is referred to as a viewable line 1a, and the other intersection line that indicates the range viewable from the viewpoint Pe2 is referred to as a viewable line 1b. The calculation processor 120 specifies the two viewable lines 1a, 1b (step S16). Next, the calculation processor 120 specifies the positions of the upper end and the lower end of each of the viewable lines 1a, 1b (step S17).

Here, of the upper end of the screen 1 on the upper surface of the top board 51, the portion that is the farthest from the viewpoint Pe1 is referred to as an end portion Sm, and the portion that is the closest from the viewpoint Pe1 is referred to as an end portion Sn. That is, of the upper end of the screen 1 on the upper surface of the top board 51, the end portion Sm is the portion that is the closest from the viewpoint Pe2, and the end portion Sn is the portion that is the farthest from the viewpoint Pe2. The end portion Sm that is the upper end of the screen 1 is viewable from the viewpoint Pe1. Therefore, the end portion Sm is the upper end of the viewable line 1a.

On the other hand, when a vertex Sf that is the lower end of the screen 1 may not be viewable from the viewpoint Pe1 because of being shielded by a portion that is closer to the viewpoint Pe1 than the vertex Sf. Therefore, when the vertex Sf of the screen 1 is not viewable from the viewpoint Pe1, the point Sg at which the straight line passing through the viewpoint Pe1 and the end portion Sn intersects with the viewable line 1a is the lower end of the viewable line 1a. When the vertex Sf of the screen 1 is viewable from the viewpoint Pe1, the vertex Sf is the lower end of the viewable line 1a.

Similarly, the end portion Sn is the upper end of the viewable line 1b. When the vertex Sf of the screen 1 is not viewable from the viewpoint Pe2, the point Sh at which the straight line passing through the viewpoint Pe2 and the end portion Sm intersects with the viewable line 1b is the lower end of the viewable line 1b. On the other hand, when the vertex Sf of the screen 1 is viewable from the viewpoint Pe2, the vertex Sf is the lower end of the viewable line 1b.

Thereafter, the calculation processor 120 specifies first to fourth straight lines L1 to L4 (step S18). The first straight line L1 is the straight line extending to a light emitter of a light ray generator 2 from the viewpoint Pe1 through the upper end of the viewable line 1a, and the second straight line L2 is the straight line extending to a light emitter of a light ray generator 2 from the viewpoint Pe1 through the lower end of the viewable line 1a. The third straight line L3 is the straight line extending to a light emitter of a light ray generator 2 from the viewpoint Pe2 through the upper end of the viewable line 1b, and the fourth straight line L4 is the straight line extending to a light emitter of a light ray generator 2 from the viewpoint Pe2 through the lower end of the viewable line 1b.

Figure 8:
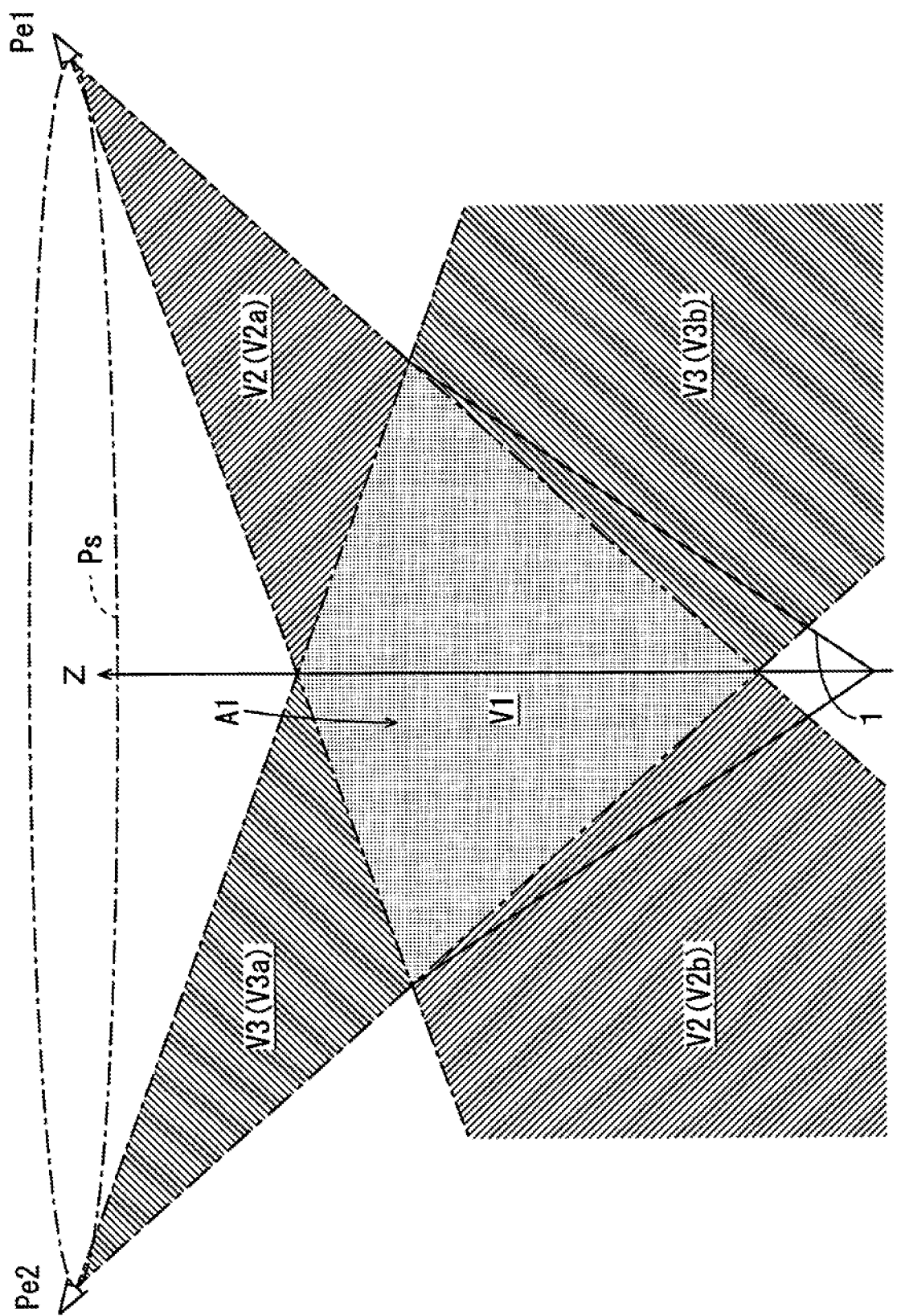
FIG. 8 is a diagram for explaining the steps of creating the shared area and the plurality of specific areas.

Next, the calculation processor 120 specifies a quadrangle area A1 surrounded by the first to fourth straight lines L1 to L4 (step S19). In FIG. 7, the Quadrangle area A1 is indicated by a dotted pattern. Subsequently, the calculation processor 120 rotates the quadrangle area A1 by 180° with the axis Z as the center (step S20). Thereafter, the calculation processor 120 creates the three-dimensional area (space) through which the quadrangle area A1 has passed due to rotation as a shared area V1 (step S21). When the vertex Sf is not viewable from the viewpoints Pe1, Pe2, the outer peripheral surface of the cone shape in the lower portion of the shared area V1 does not fit with the screen 1. In FIG. 8, the shared area V1 is indicated by a dotted pattern.

Figure 9:
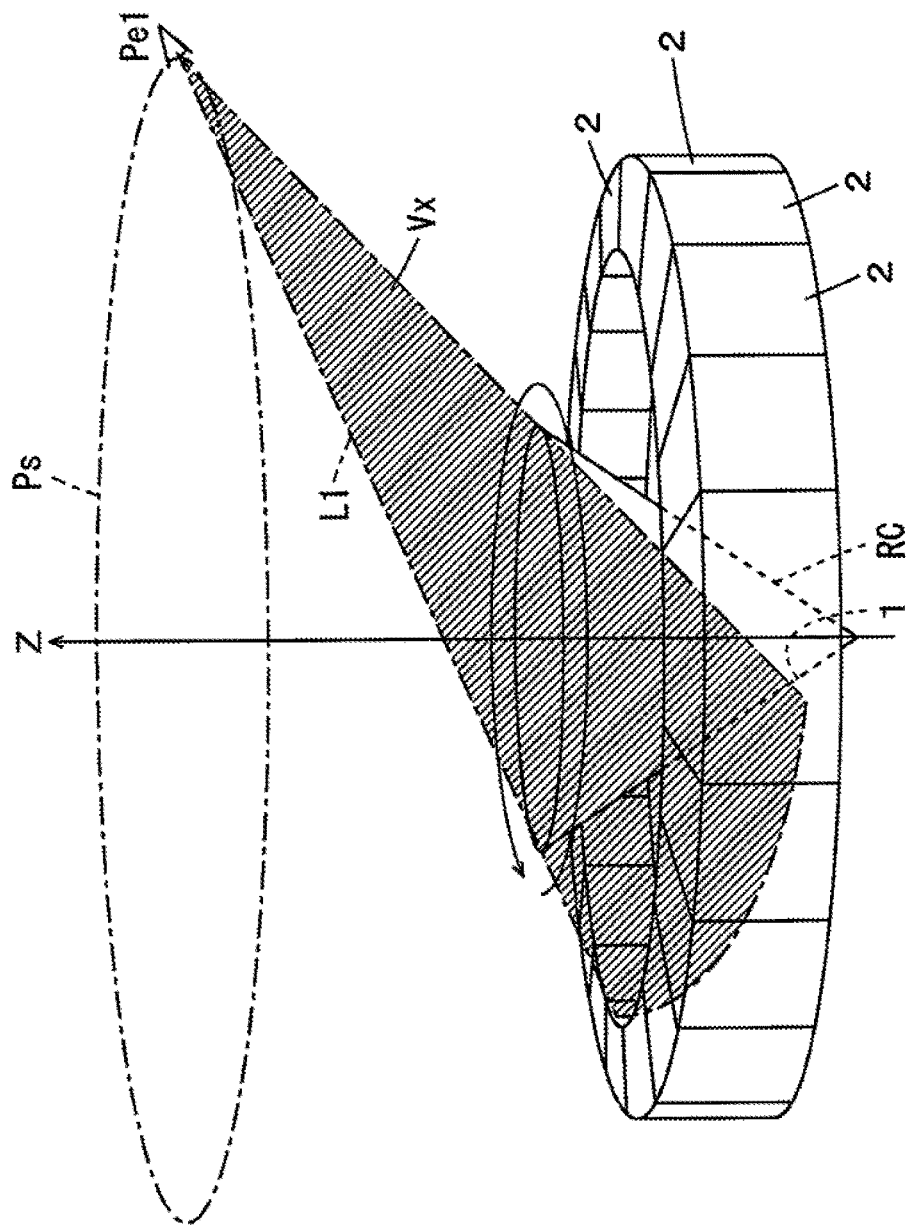
FIG. 9 is a diagram for explaining the steps of creating the shared area and the plurality of specific areas.

Next, as shown in FIG. 9, the calculation processor 120 sweeps the first straight line L1 on the circumference at the upper end of the screen 1 with the viewpoint Pe1 as a supporting point (step S22). Subsequently, the calculation processor 120 specifies the three-dimensional area surrounded by the swept first straight line L1 as an arrangement area Vx where a three-dimensional image 300 observable from the viewpoint Pe1 is to be arranged (step S23). In FIG. 9, the arrangement area Vx is indicated by a first hatching pattern.

Thereafter, the calculation processor 120 creates the portion excluding the shared area V1 of the arrangement area Vx as a specific area V2 corresponding to the occupied area P1 (step S24). In FIG. 8, the specific area V2 is indicated by the first hatching pattern. The specific area V2 includes a partial area V2a positioned closer to the viewpoint Pe1 than the screen 1 and a partial area V2b positioned farther from the viewpoint Pe1 than the screen 1.

While the arrangement area Vx is specified by sweeping of the first straight line L1 in the steps S22 and S23, the present invention is not limited to this. The arrangement area Vx may be created by sweeping of the second straight line L2. Alternatively, the specific area V2 may be created by sweeping of the straight line extending to a light emitter of a light ray generator 2 from the viewpoint Pe1 through any point at the upper end of the screen 1. That is, the range that is viewable from the viewpoint Pe1 of the inner surface of the screen may be specified as a viewable range, and the arrangement area Vx may be specified based on the viewable range.

Figure 10:
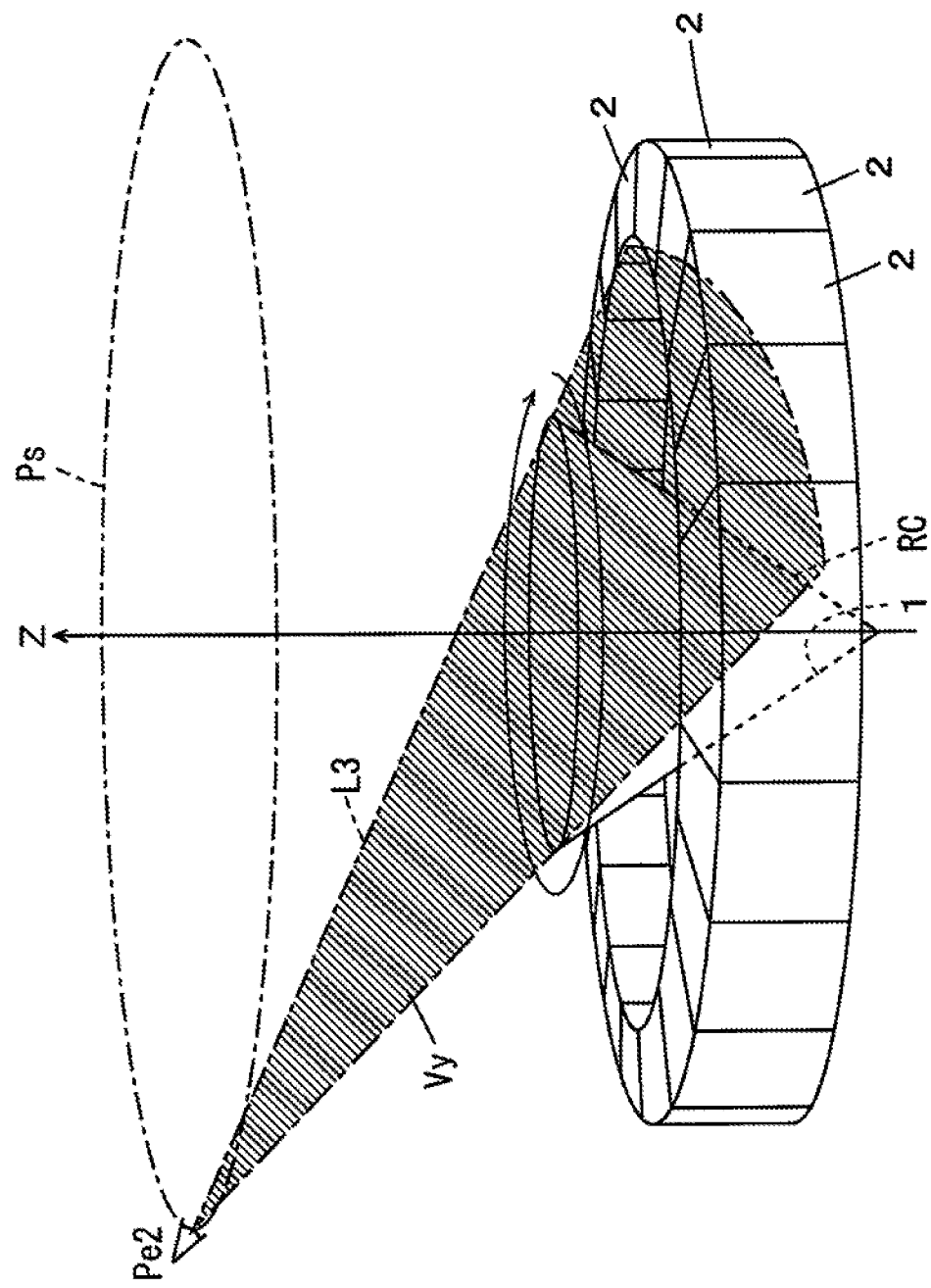
FIG. 10 is a diagram for explaining the steps of creating the shared area and the plurality of specific areas.

Similarly, as shown in FIG. 10, the calculation processor 120 sweeps the third straight line L3 on the circumference at the upper end of the screen 1 with the viewpoint Pe2 as a supporting point (step S25). Subsequently, the calculation processor 120 specifies the three-dimensional area surrounded by the swept third straight line L3 as an arrangement area Vy where the three-dimensional image 300 that is observable from the viewpoint Pe2 is to be arranged (step S26). In FIG. 10, the arrangement area Vy is indicated by a second hatching pattern.

Thereafter, the calculation processor 120 creates the portion excluding the shared area V1 of the arrangement area Vy as a specific area V3 corresponding to the occupied area P5 (step S27). In FIG. 8, the specific area V3 is indicated by the second hatching patter. The specific area V3 includes a partial area V3a positioned closer to the viewpoint Pe2 than the screen 1 and the partial area V3b positioned farther from the viewpoint Pe2 than the screen 1.

While the specific area V3 is created by sweeping of the third straight line L3 in the steps S25 and S26, the present invention is not limited to this. The specific area V3 may be created by sweeping of the fourth straight line L4. Alternatively, the specific area V3 may be created by sweeping of the straight line extending to a light emitter of a light ray generator 2 from the viewpoint Pe2 through any point at the upper end of the screen 1. That is, the area in the inner surface of the screen 1 that is viewable from the viewpoint Pe2 may be specified as a viewable range, and the arrangement area Vy may be specified based on the viewable range. Either the process of the steps S22 to S24 or the process of the steps S25 to S27 may be performed first, or both of the process of the steps S22 to S24 and the process of the steps S25 to S27 may be performed simultaneously.

When the shared three-dimensional image 310 is presented in the shared area V1 that is created in this manner, the observer 10 can view the shared three-dimensional image 310 from every position in the viewing area Ps. Therefore, the producer of the three-dimensional image 300 can easily produce the shared three-dimensional image 310 that is viewable from every position in the viewing area Ps by arranging the shared three-dimensional image 310 in the shared area V1.

On the other hand, when the specific three-dimensional image 320 is presented in the created specific area V2, the observer 10A can view the specific three-dimensional image 320 from a predetermined position in the occupied area P1. However, the observer 10B cannot view the specific three-dimensional image 320. Similarly, when the specific three-dimensional image 330 is presented in the created specific area V3, the observer 10B can view the specific three-dimensional image 330 from a predetermined position in the occupied area P5. However, the observer 10A cannot view the specific three-dimensional image 330.

In this manner, the producer of the three-dimensional image 300 can easily produce the specific three-dimensional image 320 that is viewable only by the observer 10A by arranging the specific three-dimensional image 320 in the specific area V2. Further, the producer of the three-dimensional image 300 can easily produce the specific three-dimensional image 330 that is viewable only by the observer 10B by arranging the specific three-dimensional image 330 in the specific area V3.

Further, with the above-mentioned configuration, the observer 10A who is good at reading in Japanese does not view the specific three-dimensional image 330 showing the character string in English but views the specific three-dimensional image 320 showing the character string in Japanese. Therefore, the observer 10A can read the specific there-dimensional image 320 without stress. Similarly, the observer 10B who is good at reading in English does not view the specific three-dimensional image 320 showing the character string in Japanese but views the specific three-dimensional image 330 showing the character string in English. Therefore, the observer 10B can read the specific three-dimensional image 330 without stress.

Figure 11:
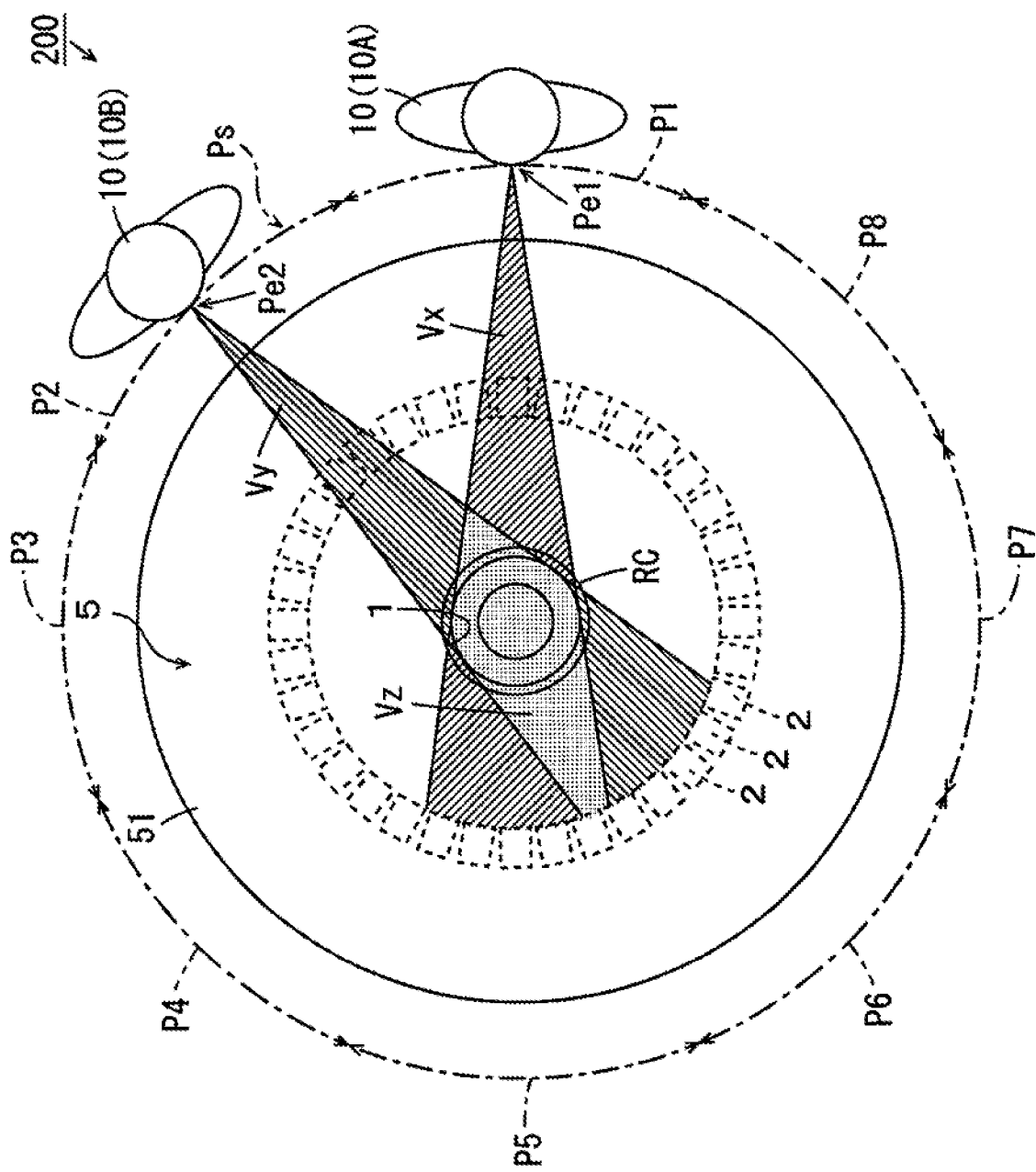
FIG. 11 is a diagram for explaining the steps of creating specific areas corresponding to adjacent occupied areas.

While the specific areas V2, V3 respectively corresponding to the occupied areas P1, P5 are created in the above-mentioned steps, the present invention is not limited to this. Part or all of the specific areas corresponding to the other occupied areas P2 to P4, P6 to P8 may be created by the steps similar to the above-mentioned steps. FIG. 11 is a diagram for explaining the steps of creating the specific areas corresponding to the adjacent occupied areas P1, P2. In the example of FIG. 11, the following points are different from the examples of FIGS. 7 to 10.

As shown in FIG. 11, the observer 10B is present not in the occupied area P5 but in the occupied area P2 adjacent to the occupied area P1. In this case, the arrangement area Vx and the arrangement area Vy have an interference area Vz in which the arrangement area Vx and the arrangement area Vy overlap with each other. In FIG. 11, the arrangement area Vx corresponding to the viewpoint Pe1 of the observer 10A is indicated by the first hatching pattern, and the arrangement area Vy corresponding to the viewpoint Pe2 of the observer 10B is indicated by the second hatching pattern. Further, the interference area Vz is indicated by the dotted patter. The shared area V1 overlaps with part of the interference area Vz.

The three-dimensional image 300 arranged in the interference area Vz is observable by both of the observers 10A, 10B. As such, when it is desirable that the observer 10B is not allowed to observe the specific three-dimensional image 320 arranged in the specific area V2, the portion excluding the interference area Vz as well as the shared area V1 of the arrangement area Vx may be the specific area V2. Similarly, when it is desirable that the observer 10A is not allowed to observe the specific three-dimensional image 330 arranged in the specific area V3, the portion excluding the interference area Vz as well as the shared area V1 of the arrangement area Vy may be the specific area V3.

(5) Modified Examples (1) First Modified Example

Figure 12:
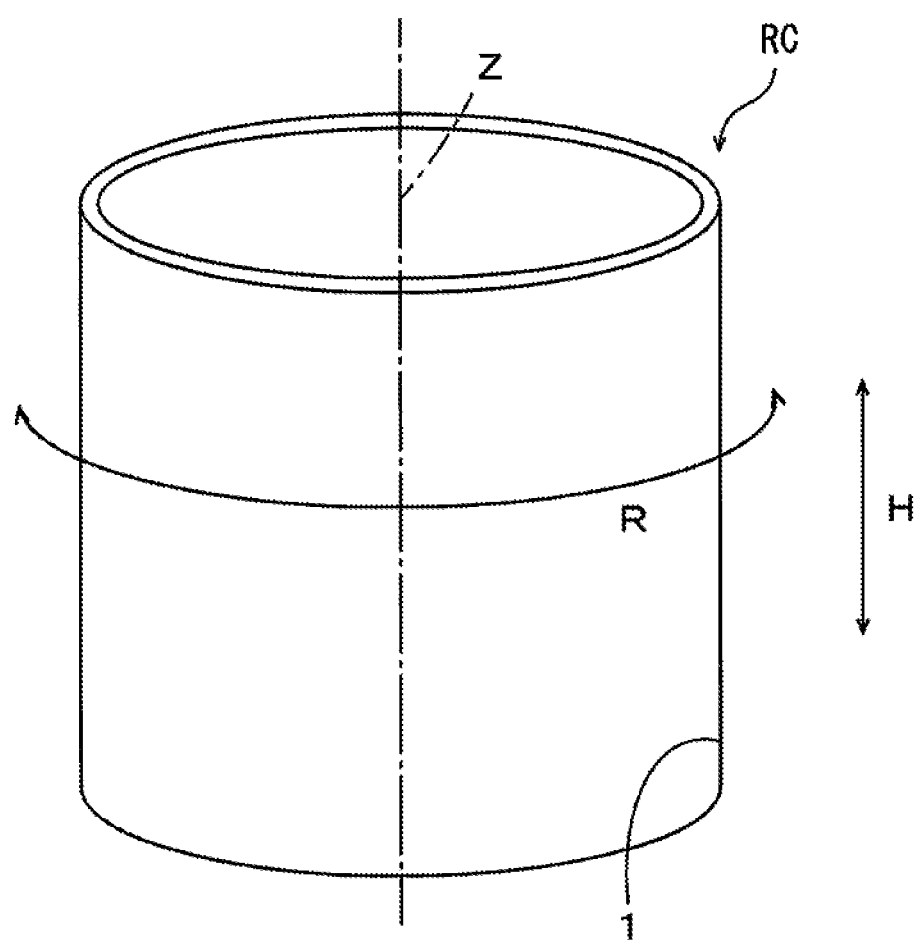
FIG. 12 is a perspective view of a light ray controller in a first modified example.

While the light ray controller RC has a cone shape in the above-mentioned embodiment, the present invention is not limited to this. The light ray controller RC may have another shape. FIG. 12 is a perspective view of a light ray controller RC in a first modified example. As shown in FIG. 12, the light ray controller RC has a rotationally-symmetric cylindrical shape with an axis Z extending in the up-and-down direction as the center. A screen 1 is formed at an inner peripheral surface of the light ray controller RC.

The upper base and the lower base of the light ray controller RC are open. The light ray controller RC is formed such that the incident light ray is transmitted while being diffused in an up-and-down direction H, and is formed such that the incident light ray is transmitted while not being diffused in the circumferential direction R with the axis Z as the center and travels in a straight line. The light ray controller RC is fitted into the circular hole of the top board 51 of FIG. 3 such that the upper base opening is directed upward. Observers 10 who are around the table 5 of FIG. 4 can observe an inner peripheral surface of the light ray controller RC obliquely from above the top board 51 of the table 5.

Figure 13:
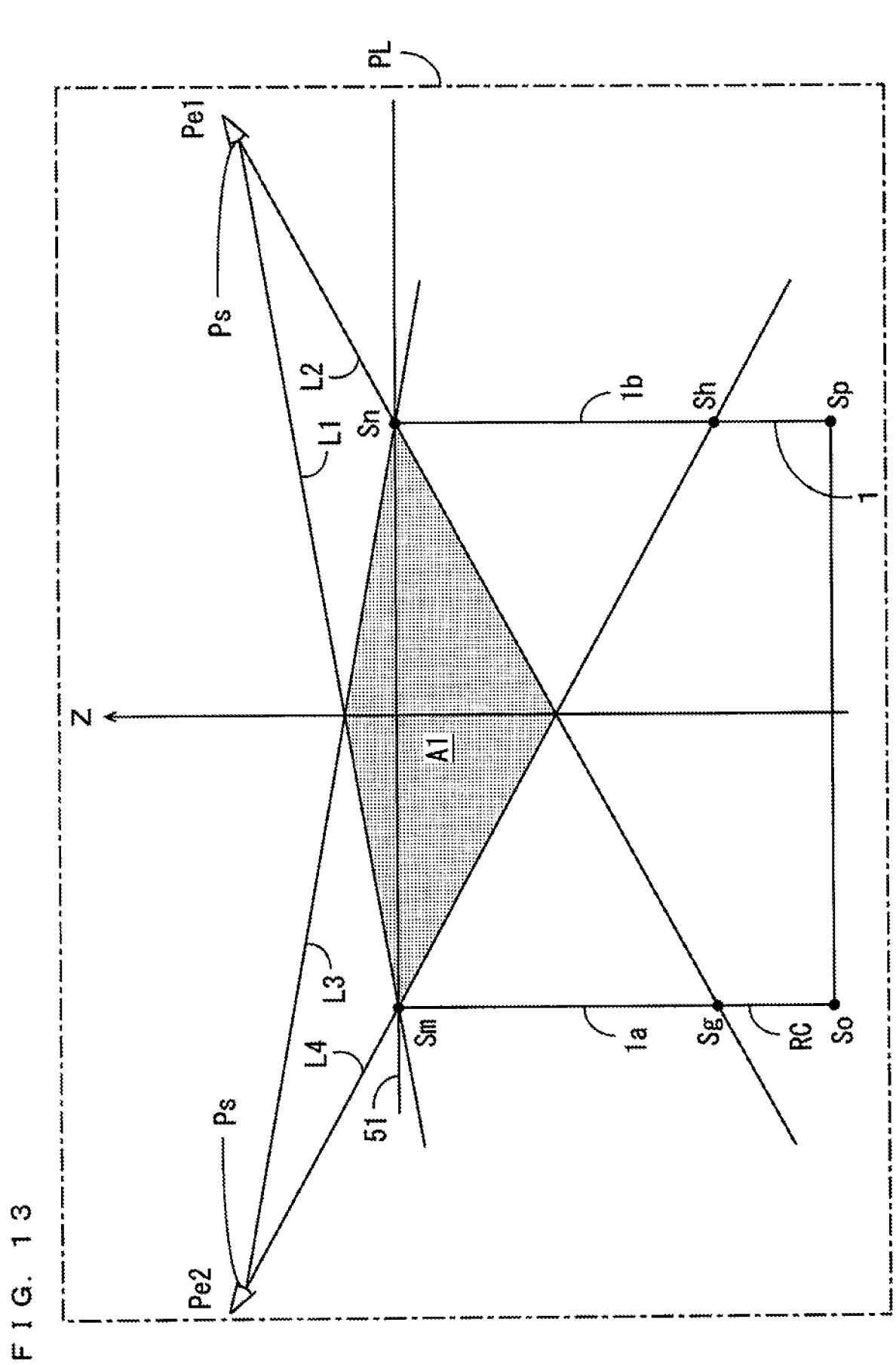
FIG. 13 is a diagram for explaining the steps of creating a shared area and a plurality of specific areas in a cylindrical screen.
Figure 14:
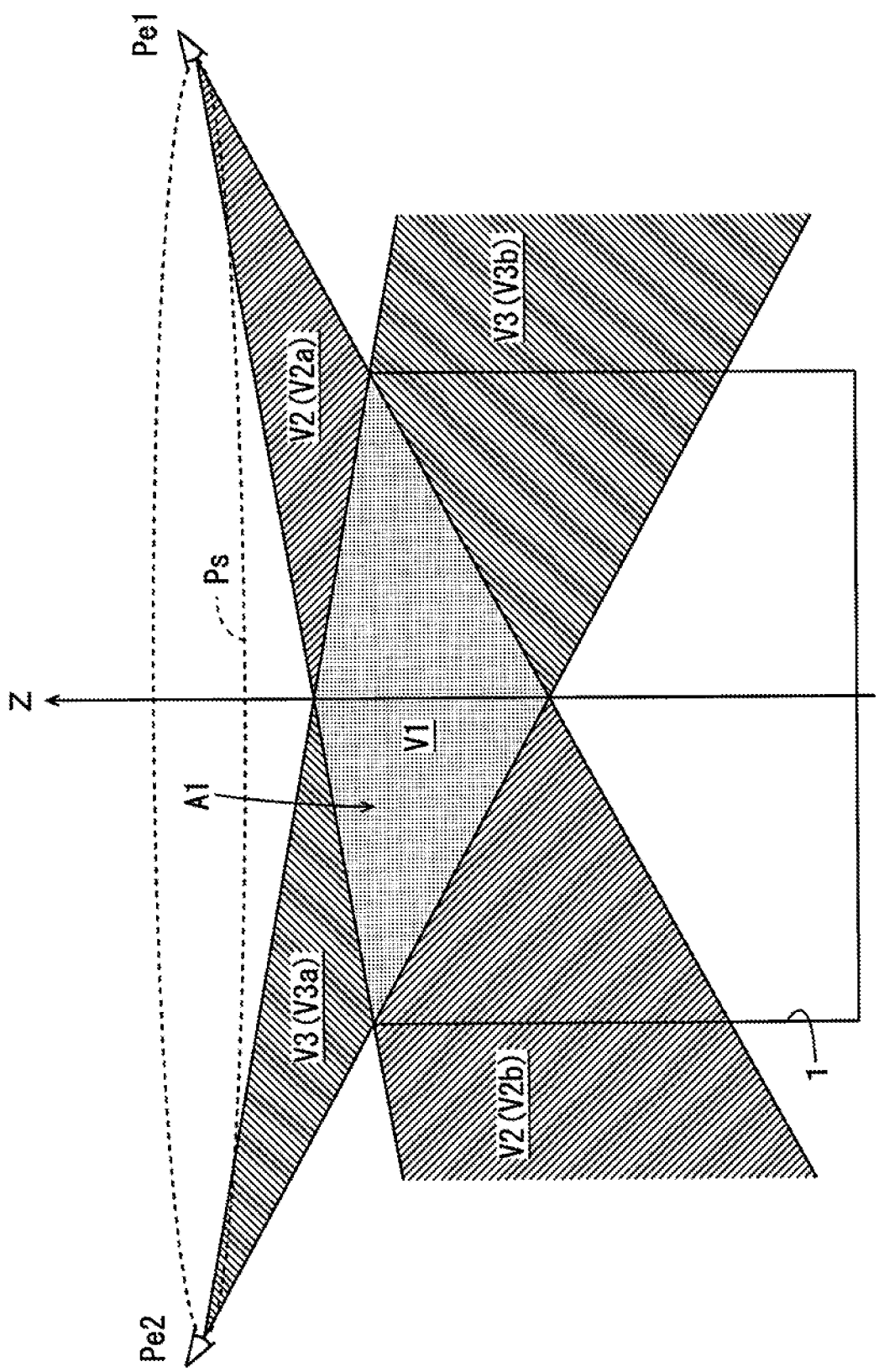
FIG. 14 is a diagram for explaining the steps of creating the shared area and the plurality of specific areas in the cylindrical screen.

FIGS. 13 and 14 are diagrams for explaining the steps of creating a shared area and a plurality of specific areas in the cylindrical screen 1. The steps of creating the shared area and the plurality of specific areas in the cylindrical screen 1 are described using the flow chart of FIG. 6 and FIGS. 13 and 14. The process of the steps S11 to S16 in the cylindrical screen 1 is similar to the process of the steps S11 to S16 in the conic screen 1.

In the process of the step S17, the calculation processor 120 specifies the positions of an upper end and a lower end of each of viewable lines 1a, 1b. Here, of the lower end of the screen 1, the portion that is the farthest from the viewpoint Pe1 is referred to as an end portion So, and the portion that is the closest from the viewpoint Pe1 is referred to as an end portion Sp. That is, of the lower end of the screen 1, the end portion So is the portion that is the closest from the viewpoint Pe2, and the end portion Sp is the portion that is the farthest from the viewpoint Pe2.

The end portion So of the screen 1 may not be viewable from the viewpoint Pe1 because of being shielded by a portion that is closer to the viewpoint Pe1 than the screen 1. Therefore, when the end portion So of the screen 1 is not viewable from the viewpoint Pe1, a point Sg at which the straight line passing through the viewpoint Pe1 and an end portion Sn intersects with a viewable line 1a is the lower end of the viewable line 1a. When the end portion So of the screen 1 is viewable from the viewpoint Pe1, the end portion So is the lower end of the viewable line 1a.

Similarly, when the end portion Sp of the screen 1 is not viewable from the viewpoint Pe2, a point Sh at which the straight line passing through the viewpoint Pe2 and the end portion Sm intersects with a viewable line 1b is the lower end of the viewable line 1b. On the other hand, when the end portion Sp of the screen 1 is viewable from the viewpoint Pe2, the end portion Sp is the lower end of the viewable line 1b.

The process of the steps S18 to S27 performed in the cylindrical screen 1 is similar to the process of the steps S18 to S27 performed in the conic screen 1. Thus, a shared area V1 and specific areas V2, V3 are created.

(b) Second Modified Example

Figure 15:
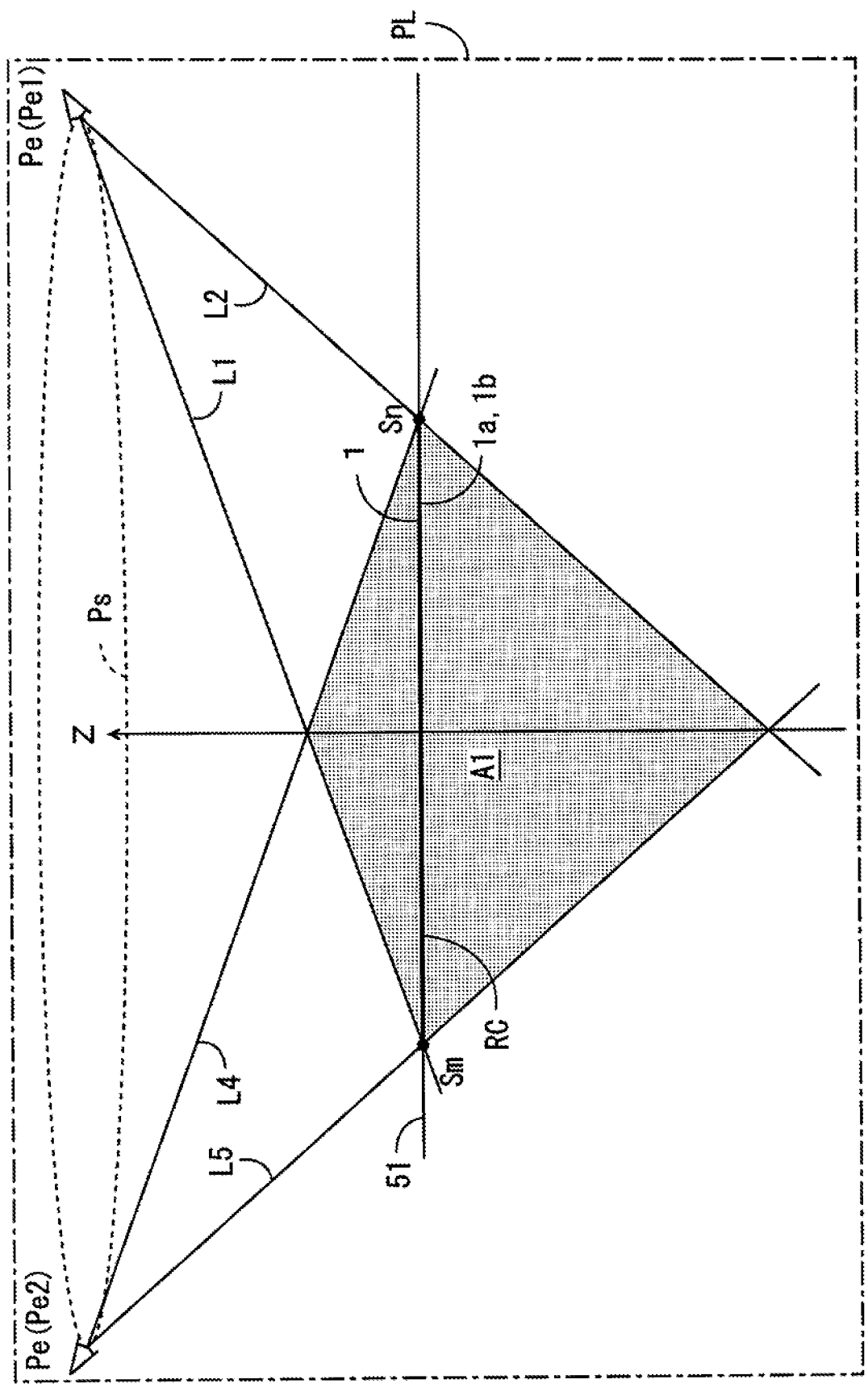
FIG. 15 is a diagram for explaining the steps of creating a shared area and a plurality of specific areas in a disc-shape screen.
Figure 16:
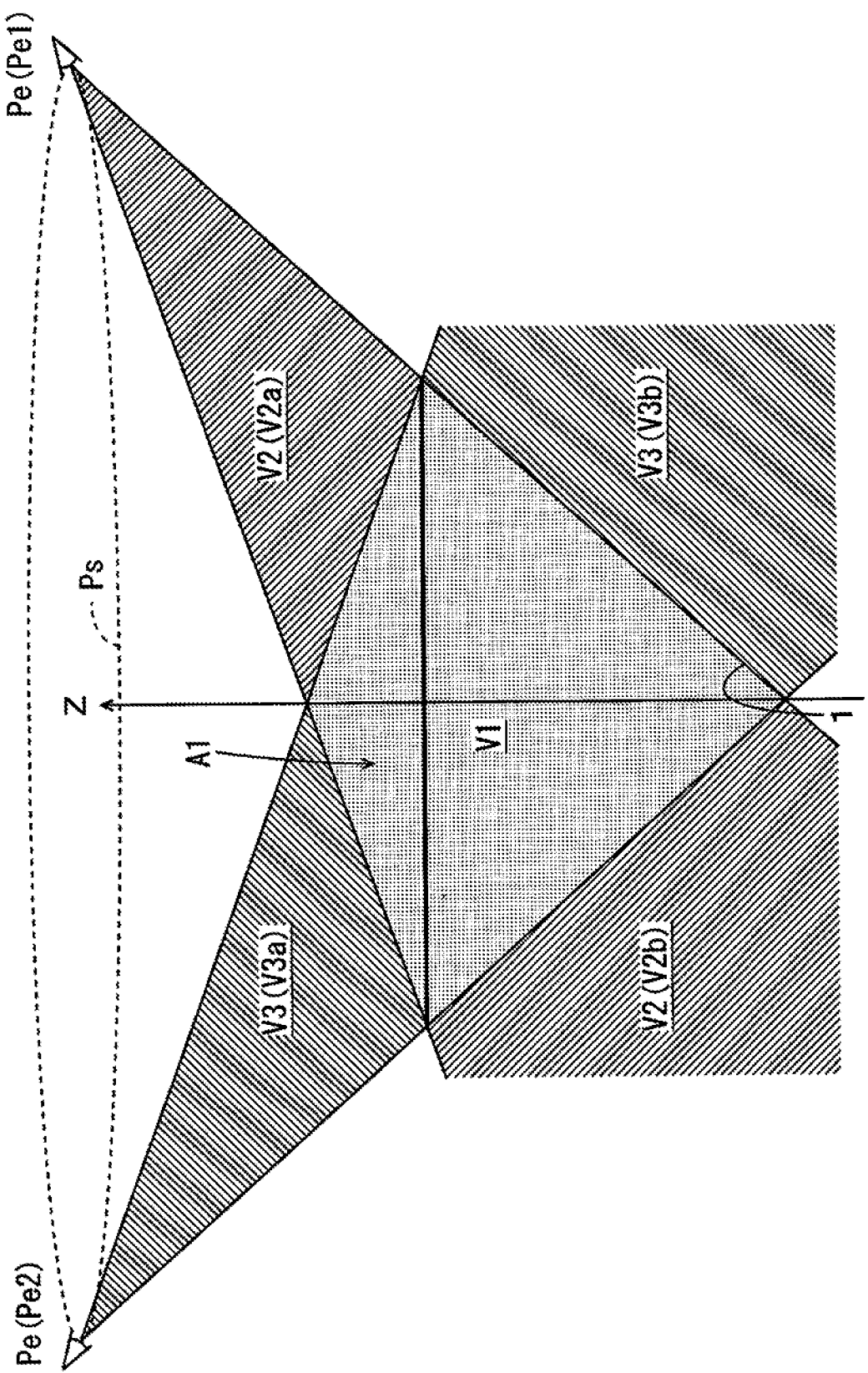
FIG. 16 is a diagram for explaining the steps of creating the shared area and the plurality of specific areas in the disc-shape screen.

A light ray controller in the second modified example has a disc shape. FIGS. 15 and 16 are diagrams for explaining the steps of creating a shared area and a plurality of specific areas in the disc-shape screen. As shown in FIG. 15, the light ray controller RC having a disc shape is fitted into a circular hole of a top board 51. A three-dimensional image is presented above the light ray controller RC. In the present example, one surface of the light ray controller RC is a screen 1.

The steps of creating the shared area and the plurality of specific areas in the disc-shape screen 1 will be described with reference to the flow chart of FIG. 6 and FIGS. 15 and 16. The process of the steps S11 to S15 performed in the disc-shape screen 1 is similar to the process of the steps S11 to S15 performed in the conic screen 1.

In the process of the step S16, a calculation processor 120 specifies two viewable lines 1a, 1b. Here, the intersection lines of the screen 1 and a virtual plane PL are the viewable lines 1a, 1b. That is, in the present example, the viewable line 1a and the viewable line 1b overlap with each other.

Next, in the process of the step S17, the calculation processor 120 specifies the positions of the upper end and the lower end of each of the viewable lines 1a, 1b. In the present example, the viewable lines 1a, 1b are horizontal. As such, one end of the viewable line 1a is considered to be equivalent to the upper end of the viewable line 1a, and the other end of the viewable line 1a is considered to be equivalent to the lower end of the viewable line 1a. Similarly, one end of the viewable line 1b is considered to be equivalent to the upper end of the viewable line 1b, and the other end of the viewable line 1b is considered to be equivalent to the lower end of the viewable line 1b.

In the example of FIG. 15, the one end of the viewable line 1a and the other end of the viewable line 1b are positioned at an end portion Sm of the screen 1. Further, the other end of the viewable line 1a and the one end of the viewable line 1b are positioned at an end portion Sn of the screen 1.

The process of the steps S18 to S27 performed in the disc-shape screen 1 is similar to the process of the steps S18 to S27 performed in the conic screen 1. Thus, the shared area V1 and the specific areas V2, V3 are created.

(6) Effects

In the three-dimensional image production support apparatus 100 according to the present embodiment, the producer of the three-dimensional image 300 can identify the shared area V1 and the specific areas V2, V3 based on the data generated by the data generator 124. Thus, the producer of the three-dimensional image 300 can easily arrange the shared three-dimensional image 310 to be viewed from any position in the viewing area Ps in the shared area V1. Further, the producer of the three-dimensional display 300 can easily arrange the specific three-dimensional images 320, 330 to be respectively observed from the viewpoints Pe1, Pe2 in the specific areas V2, V3.

The shared three-dimensional image 310 arranged in the shared area V1 is observable by the observer 10 who is present at any position in the viewing area Ps. On the other hand, the specific three-dimensional image 320 arranged in the specific area V2 is viewable only by the observer 10A who is present at the viewpoint Pe1 and not viewable by the observer 10B who is present at the viewpoint Pe2. Similarly, the specific three-dimensional image 330 arranged in the specific area V3 is viewable only by the observer 10B who is present at the viewpoint Pe2 and not viewable by the observer 10A who is present at the viewpoint Pe1.

With this configuration, it is not necessary to perform a complicated process when the three-dimensional image 300 is produced. Thus, the specific three-dimensional image 320 that is viewable only by the observer 10A who is present at the viewpoint Pe1 can be created by a simple process. Further, the specific three-dimensional image 330 that is viewable only by the observer 10B who is present at the viewpoint Pe2 can be created by a simple process.

In the present embodiment, the specific area V2 includes the partial areas V2a, V2b, and the specific area V3 includes the partial areas V3a, V3b. Therefore, the size of each of the specific areas V2, V3 can be increased easily.

Further, the producer of the three-dimensional image 300 can display the specific three-dimensional image 320 at a position closer to the viewpoint than the common three-dimensional image 310 by arranging the specific three-dimensional image 320 in the partial area V2a. The producer of the three-dimensional image 300 can display the specific three-dimensional image 320 at a position farther from the viewpoint than the common three-dimensional image 310 by arranging the specific three-dimensional image 320 in the partial area V2b.

Similarly, the producer of the three-dimensional image 300 can display the specific three-dimensional image 330 at a position closer to the viewpoint than the shared three-dimensional image 310 by arranging the specific three-dimensional image 330 in the partial area V3a. The producer of the three-dimensional image 300 can display the specific three-dimensional image 330 at a position farther from the viewpoint than the shared three-dimensional image 310 by arranging the specific three-dimensional image 330 in the partial area V3b.

(7) Correspondences Between Constituent Elements in Claims and Parts in Preferred Embodiments In the following paragraphs, non-limiting examples of correspondences between various elements recited in the claims below and those described above with respect to various preferred embodiments of the present invention are explained.

In the above-mentioned embodiment, the axis Z is an example of a center axis, the screen 1 is an example of a screen, the three-dimensional display 200 is an example of a three-dimensional display, the viewing area Ps is an example of a viewing area, and the three-dimensional image 300 is an example of a three-dimensional image. The three-dimensional image production support apparatus 100 is an example of a three-dimensional image production support apparatus, the information acquirer 121 is an example of an acquirer, the shared area V1 is an example of a shared area, and the shared area creator 122 is an example of a shared area creator. The viewpoints Pe1, Pe2 are respectively examples of first and second specific positions, the specific areas V2, V3 are respectively examples of first and second specific areas, the specific area creator 123 is an example of a specific area creator, and the data generator 124 is an example of a generator.

The arrangement areas Vx, Vy are respectively examples of first and second arrangement areas, the virtual plane PL is an example of a virtual plane, the viewpoints Pe1, Pe2 are respectively examples of first and second intersection points, and the viewable lines 1a, 1b are respectively examples of first and second viewable lines. The straight lines L1 to L4 are respectively examples of first to fourth lines, the quadrangle area A1 is an example of a planar area, the first straight line L1 is an example of a fifth line, and the partial areas V2a, V2b are respectively examples of first and second partial areas.

As each of constituent elements recited in the claims, various other elements having configurations or functions described in the claims can be also used.

INDUSTRIAL APPLICABILITY

The present invention can be effectively utilized for various three-dimensional displays that display three-dimensional images.

The invention claimed is:

1. A three-dimensional image production support apparatus that assists production of a three-dimensional image that is presented by a three-dimensional display including a screen having a shape surrounding a center axis extending in an up-and-down direction and is observable from a viewing area defined to be annular and surround the center axis, comprising:
an acquirer that acquires information indicating a shape of the screen, a shape of the viewing area and a relative positional relationship between the viewing area and the screen;
a shared area creator that creates an area, in which a three-dimensional image presented by the three-dimensional display is to be arranged in order to be observed from any position in the viewing area, as a shared area based on the information acquired by the acquirer;
a specific area creator that creates an area, in which a three-dimensional image presented by the three-dimensional display is to be arranged in order to be observed from a predetermined first specific position in the viewing area, as a first specific area based on the information acquired by the acquirer; and
a generator that generates data indicating the shared area created by the shared area creator and data indicating the first specific area created by the specific area creator, wherein
the specific area creator specifies a range that is viewable from the first specific position in an inner surface of the screen as a viewable range, specifies an area in which a three-dimensional image that is observable from the first specific position is to be arranged as a first arrangement area based on the viewable range, and creates a portion excluding the shared area created by the shared area creator of the first arrangement area as the first specific area.

2. The three-dimensional image production support apparatus according to claim 1, wherein
the specific area creator specifies a range that is viewable from a predetermined second specific position in the inner surface of the screen as a viewable range, specifies an area in which a three-dimensional image that is observable from the second specific position is to be arranged as a second arrangement area based on the viewable range and creates a portion excluding the shared area and the second arrangement area of the first arrangement area as the first specific area.

3. The three-dimensional image production support apparatus according to claim 2, wherein
the specific area creator creates a portion excluding the shared area and the first arrangement area of the second arrangement area as the second specific area, and
the generator further generates data indicating the second specific area created by the specific area creator.

4. The three-dimensional image production support apparatus according to claim 1, wherein the shared area creator sections the screen and the viewing area with a virtual plane including the center axis, specifies first and second intersection points that are positioned opposite to each other with the center axis interposed therebetween as intersection points of the virtual plane and the viewing area, specifies one or a plurality of intersection lines as an intersection line of the virtual plane and the screen, specifies a line that indicates a range viewable from the first intersection point out of the one or plurality of intersection lines as a first viewable line, specifies a line that indicates a range viewable from the second intersection point out of the one or plurality of intersection lines as a second viewable line, creates a planar area that is surrounded by a first line extending in a straight line from the first intersection point through one end of the first viewable line, a second line extending in a straight line through the first intersection point and another end of the first viewable line, a third line extending in a straight line from the second intersection point through one end of the second viewable line and a fourth line extending in a straight line from the second intersection point through another end of the second viewable line, and creates an area through which the planar area has passed by rotating the planar area about the center axis as the shared area.

5. The three-dimensional image production support apparatus according to claim 1, wherein
the specific area creator specifies a fifth line extending in a straight line from the first specific position through any portion at one end of the screen, and specifies an area surrounded by the fifth line by sweeping the fifth line on one end of the screen with the first specific position as a supporting point as the first arrangement area.

6. The three-dimensional image production support apparatus according to claim 1, wherein
the first specific area includes a first partial area that is arranged closer to the first specific position than the screen and a second partial area that is arranged farther from the specific position than the screen.

* * * * *